(12) United States Patent
Sugiura

(10) Patent No.: US 6,814,402 B2
(45) Date of Patent: Nov. 9, 2004

(54) SUNROOF STRUCTURE

(75) Inventor: Takumi Sugiura, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/330,600

(22) Filed: Dec. 26, 2002

(65) Prior Publication Data
US 2003/0122406 A1 Jul. 3, 2003

(30) Foreign Application Priority Data
Dec. 28, 2001 (JP) .................................. P. 2001-398891

(51) Int. Cl.[7] .............................. B60J 7/053; B60J 7/22
(52) U.S. Cl. ...................... 296/213; 296/217; 296/222
(58) Field of Search ........................... 296/213, 216.06, 296/216.09, 217, 221–222

(56) References Cited

U.S. PATENT DOCUMENTS

| | | | | |
|---|---|---|---|---|
| 4,417,763 A | * | 11/1983 | Schlapp et al. | ............. 296/221 |
| 4,709,959 A | * | 12/1987 | Paerisch et al. | ............ 296/217 |
| 5,451,091 A | * | 9/1995 | Schleicher | .................. 296/217 |
| 6,390,543 B1 | * | 5/2002 | Tolinksi | ...................... 296/217 |

* cited by examiner

Primary Examiner—Dennis H. Pedder
(74) Attorney, Agent, or Firm—Darby & Darby (57) ABSTRACT

A sunroof structure has a movable lid adapted to close a sunroof opening opened in a vehicle roof panel when a sunroof is closed and to be accommodated in the interior of a roof of a vehicle when the sunroof is opened; a roof actuating unit for moving the movable lid in longitudinal directions of the vehicle; a pair of side rails disposed along both sides of a moving path of the movable lid; and, a resilient member mounted on a lower side of the movable lid along at least rear end edge thereof so as to be suspended downwardly so as to improve appearance thereof when looked from an inside of the passenger compartment.

10 Claims, 9 Drawing Sheets

(PRIOR ART)

FIG.9

SUNROOF STRUCTURE

BACKGROUND OF THE INVENTION

1. Field of the Invention

The present invention relates to the structure of a sunroof provided in a roof portion of a vehicle, particularly to a better appearance thereof when looked from an inside of a passenger compartment.

2. Description of the Related Art

There exists a vehicle having a sunroof provided in a roof portion thereof to be opened and closed. The sunroof is used to get light in and air out of a passenger compartment of the vehicle. The sunroof opened and closed is formed of the same sheet metal as that used for the roof or of glasses. As opening and closing modes of the sunroof there are modes in which only a rear end of the sunroof is tilted upwardly (a tilt-up mode) and in which the sunroof slides rearward to be drawn into the interior of the roof.

Figure 9:
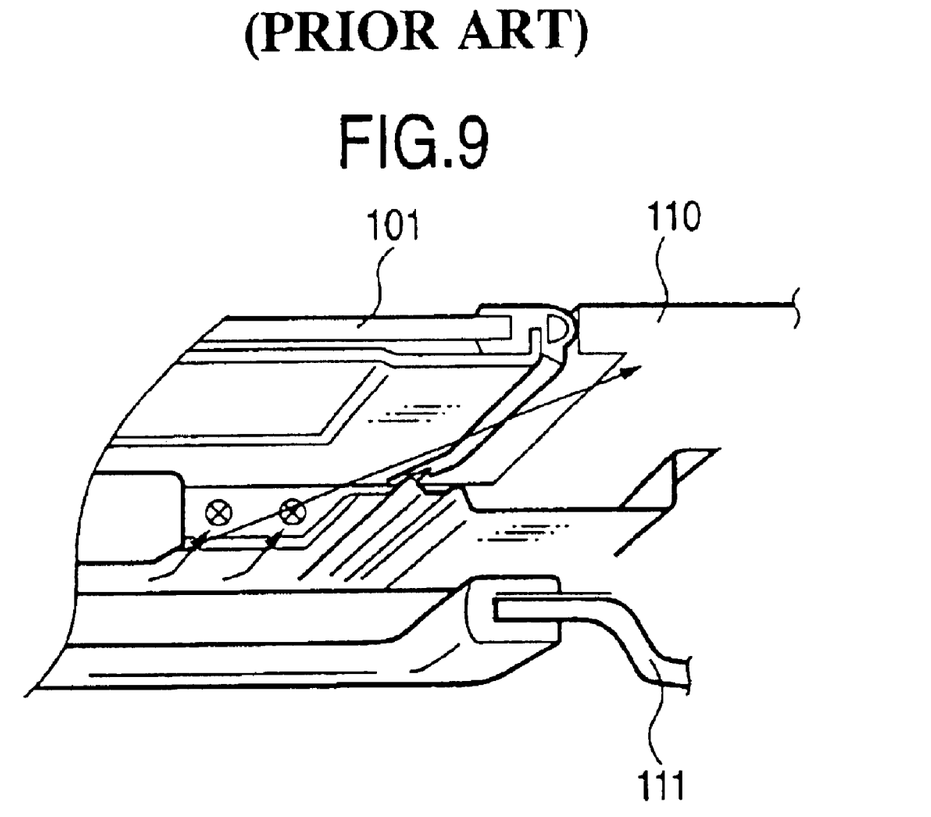
FIG. 9 is a sectional perspective view showing the vicinity of a rear end edge of a movable lid according to a conventional sunroof structure.

In the latter mode in which the sunroof is drawn into the interior of the roof, as shown in FIG. 9, a space is formed between a roof (outer) panel 110 and a roof trim (or a roof inner panel) on the passenger compartment side for accommodating a movable lid 101 of the sunroof. The movable lid 101 of the sunroof becomes flush with an outer surface of the roof at an upper surface thereof when closed, whereas when opened the movable lid 1 slides rearward to be drawn into the interior of the roof after the movable lid 1 is lowered once or while it is lowered. Due to this, the aforementioned space is required in any case.

However, there may be a risk that the painted surface of the back of the roof panel or spot welded marks thereon can be seen through the space from the passenger compartment (refer to arrows in FIG. 9), leading to the deterioration in internal appearance. Therefore there have long been demanded further improvements in internal appearance. In particular, since nothing can be disposed in a direction in which the sunroof is accommodated (normally, toward the rear of the vehicle) in the periphery of the opening of the sunroof which hinders the accommodation thereof, the interior of the roof tends to be seen easily through the space.

SUMMARY OF THE INVENTION

An object of the present invention is to provide a sunroof structure which can improve the appearance from the passenger compartment without damaging the function of the sunroof.

According to a first aspect of the present invention, there is provided a sunroof structure for a vehicle, having; a movable lid adapted to close a sunroof opening opened in a vehicle roof panel when a sunroof is closed and to be accommodated in the interior of a roof of a vehicle when the sunroof is opened; a roof actuating unit for moving the movable lid in longitudinal directions of the vehicle; a pair of side rails disposed along both sides of a moving path of the movable lid; and, a resilient member mounted on a lower side of the movable lid along at least a rear end edge thereof so as to be suspended downwardly.

According to the sunroof structure of the first aspect, the line of sight from the passenger compartment to the interior of the roof is blocked by the resilient member mounted on the lower surface of the movable lid along the rear end edge so that the interior cannot be seen, thereby making it possible to improve the internal appearance.

According to a second aspect of the present invention, there is provided a sunroof structure as set forth in the first aspect of the present invention, wherein the moving unit moves the movable lid downwardly and rearward when the sunroof is operated, wherein a drain plate adapted to move rearward together with the movable lid is disposed below the rear end edge of the movable lid on the pair of side rails substantially at right angles relative to the pair of side rails, and wherein the resilient member is pressed against an upper surface of the drain plate to be deformed when the sunroof is operated.

According to the sunroof structure of the second aspect, since the resilient member is pressed against the upper surface of the drain plate when the sunroof is operated to open to thereby leave no space between the resilient member and the drain plate, the line of sight to the interior of the roof can completely be blocked, thereby making it possible to realize a further improvement in internal appearance.

According to a third aspect of the present invention, there is provided a sunroof structure as set forth in the first or second aspect of the present invention, wherein the resilient member is provided in such a manner that end portions thereof extend around corners of the movable lid to be disposed along side edges of the movable lid.

According to the sunroof structure of the third aspect of the present invention, since the resilient member is provided such that end portions thereof extend around corners of the movable lid to be disposed along side edges of the movable lid, even the lines of sight into the interior of the roof through spaces formed on rearward sides of the movable lid can be blocked to thereby realize a further improvement in the appearance.

According to a fourth aspect of the present invention, there is provided a sunroof structure as set forth in the third aspect of the present invention, wherein the moving unit has at least a pair of brackets for moving the movable lid along the side rails while supporting the movable lid from below, and wherein the end portion of the resilient member is situated on back sides of rearmost brackets.

According to the sunroof structure of the fourth aspect of the present invention, since the end portions of the resilient member are situated on the back sides of the rearmost brackets, an abnormal feeling that would otherwise be caused by an abrupt dis continuity of the surface of the resilient member can be eliminated.

According to a fifth aspect of the present invention, there is provided a sunroof structure as set forth in the first aspect of the present invention, wherein the movable lid comprises a sheet glass and a retainer, and the resilient member is disposed on the sheet glass through the retainer.

DETAILED DESCRIPTION OF THE PREFERRED EMBODIMENTS

Figure 1:
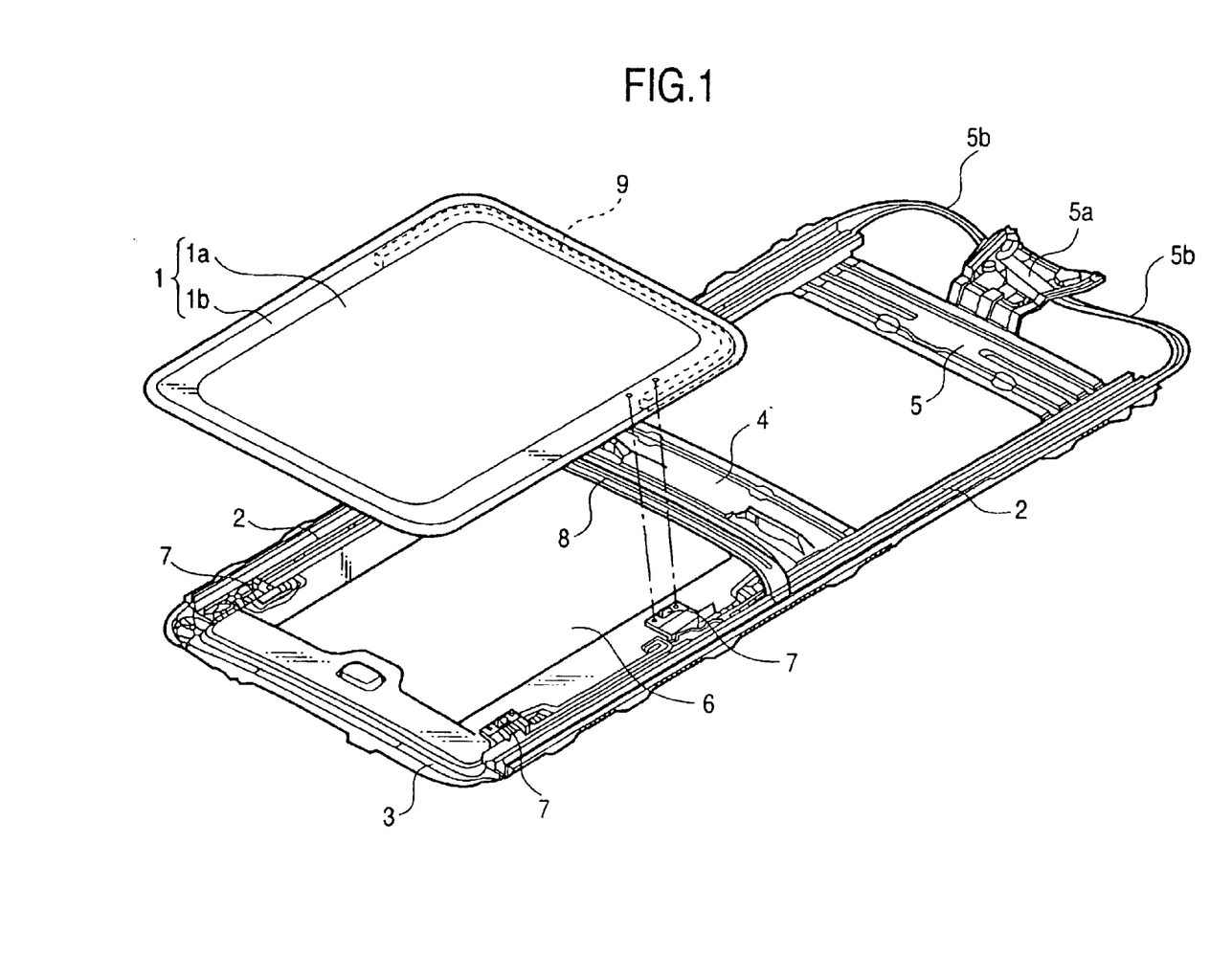
FIG. 1 is a perspective view showing sunroof modules according to a sunroof structure of an embodiment according to the present invention.

Referring to the accompanying drawings, an embodiment of the present invention will be described below. Shown in FIG. 1 are modules of a sunroof having a sunroof structure according to an embodiment of the invention. Neither roof panel nor a roof trim is shown in FIG. 1. The sunroof modules shown in FIG. 1 are accommodated in the interior of a roof of a vehicle except for a movable lid 1 adapted to be opened and closed. The movable lid 1 forms a same plane level as the surface of the roof when the sunroof is closed, whereas when the sunroof is opened the movable lid 1 is accommodated in the interior of the roof.

As shown in FIG. 1, the sunroof modules are formed into a ladder-like structure comprising a pair of side rails 2, a front frame 3, a center frame 4 and a rear frame 5, which frames are connected to the pair of side rails 2 substantially at right angles. The front frame 3, the center frame 4 and the rear frame 5 are fixed to the respective side frames 2 at ends thereof. The movable lid 1 is slidably disposed between the pair of side rails 2 on an upper side thereof, whereas a shade 6 is slidably disposed between the pair of side rails 2 on a lower side thereof. While the shade 6 is adapted to be opened and closed directly by a passenger or the driver from the passenger compartment side, the movable lid 1 is adapted to be opened and closed by a motor 5a and wires 5b mounted on the rear frame 5 via brackets 7, which will be described later. The motor 5a, the wires 5b, the side rails 2, the brackets 7 and link mechanisms provided in association with the brackets 7 function together as a moving unit for moving the movable lid 1 in longitudinal directions of the vehicle.

The sunroof according to the embodiment is a glass sunroof in which the movable lid 1 is formed of glasses. The movable lid 1 is mainly constituted by a sheet glass (a laminated glass) 1a and a retainer 1b. Attached to a lower surface of the sheet glass 1a along the circumference thereof is the metallic retainer 1b for facilitating the connection with the brackets 7 or the like. The sheet glass 1a and the retainer 1b are made integral by a sealing agent filled therebetween and a strip or a molding mounted on the outer periphery of the lid 1. A weather strip is also mounted on the movable lid 1 along the outer periphery thereof. Then, the brackets 7 are connected to sides of the retainer 1b at rearward and frontward positions thereof (four positions).

The brackets 7 are connected to the link mechanism (refer to FIGS. 5 to 8) provided therebelow, so that the movable lid 1 is moved in a direction toward the interior of the roof (a rearward direction of the vehicle) while being lowered downwardly when the sunroof is opened. In addition, a drain plate 8 is disposed below a rear end edge of the movable lid 1. The drain plate 8 is provided for collecting droplets of water retained on the upper surface of the movable lid 1 which are caused to drop downwardly when the sunroof is opened and guiding the droplets of water so collected as far as dripping portions (drains) of the side rails 2. The drain plate 8 is able to move rearward together with the brackets 7 and the link mechanism so as to be situated below the rear end edge of the movable lid 1 at all times.

Figure 2:
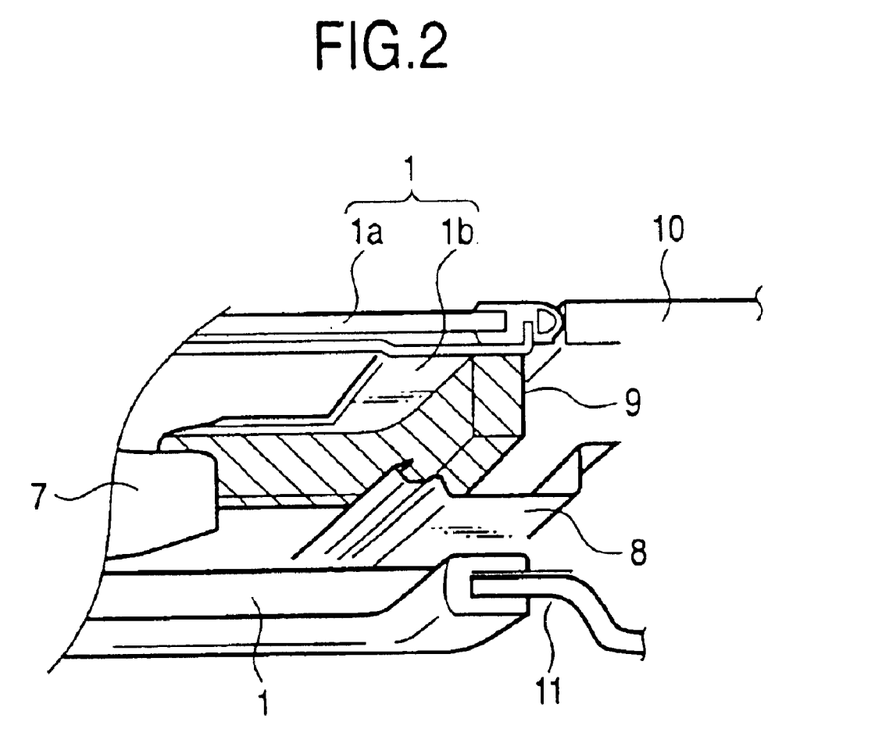
FIG. 2 is a sectional perspective view showing the vicinity of a rear end edge of a movable lid according to the embodiment shown in FIG. 1.

As shown in FIGS. 1 and 2, a resilient member 9, which constitutes the feature of the embodiment, is then mounted on the movable lid 1 along the rear end thereof. It is preferable that the resilient member 9 is disposed on the sheet grass 1a through the retainer 1b. Shown in FIG. 2 are a roof panel 10 and a roof trim 11 on the passenger compartment side which are not shown in FIG. 1. The resilient member 9 is mounted on the movable lid 1 so as to extend around corners of the movable lid 1 as far as the sides thereof, and end portions of the resilient member 9 are situated, respectively, on backsides (the passenger compartment sides) of the rearmost pair of the brackets 7. The resilient member 9 is formed so as to have a certain height in a vertical direction and suspends downwardly from a lower surface of the movable lid 1.

The line of sight from the passenger compartment to the interior of the roof is blocked by inserting of the resilient member 9 into sides of the movable lid 1 so that the interior of the roof cannot be seen to thereby improve the internal appearance. The resilient member 9 improves the appearance not only by blocking the line of sight into the interior of the roof but also by allowing the surface of the resilient member 9 free from irregularities (or having fewer irregularities) to be seen. The surface of the resilient member 9 according to the embodiment is colored so as to be unified with the color of roof trims, and in this embodiment, the surface of the resilient member 9 is colored in the same color as that of the roof trim 11.

In addition, since the resilient member 9 is mounted on the movable lid 1 so as to extend around the corners of the movable lid 1 as far as the sides thereof, even the line of sight is blocked which is directed into the interior of the roof on the sides of the movable lid 1 at rearward positions, a further improvement in internal appearance can be realized. Additionally, since the resilient member 9 is mounted on the movable lid 1 in a U-shaped fashion, the bonding strength of the resilient member 9 to the movable lid 1 is increased, whereby the shape retention properties of the resilient member 9 is also improved. Furthermore, as has been described above, the end portions of the resilient member 9 which is allowed to extend as far as the sides of the movable lid 1 are situated on the back sides of the rearmost brackets 7. Owing to this, since an abnormal feeling felt from an abrupt discontinuity of the surface of the resilient member 9 (discontinuity of the surface) is concealed by the brackets 7, a further improvement in the appearance can be realized. Note that even if the resilient member 9 discontinues on the back sides of the brackets 7, since the brackets 7 themselves have effectiveness in blocking the line of sight into the interior of the roof, the effectiveness in blocking the line of sight into the interior of the roof is continuously maintained.

Note that there is caused no risk that the function of the sunroof is damaged by the provision of the resilient member 9. As has been described above, when the sunroof is opened the movable lid 1 slides in the rearward direction of the vehicle (a direction in which the movable lid 1 is accommodated into the interior of the roof) after it is once lowered downwardly (or while it is being lowered). Due to this, although there is caused a concern that the descending of the movable lid 1 is blocked by the resilient member 9, there occurs no such concern that the descending of the movable lid 1 is blocked by the resilient member 9. Referring to FIGS. 3 to 8, how the resilient member 9 operates when the sunroof is opened will be described together with the movement of the movable lid 1.

Figure 3:
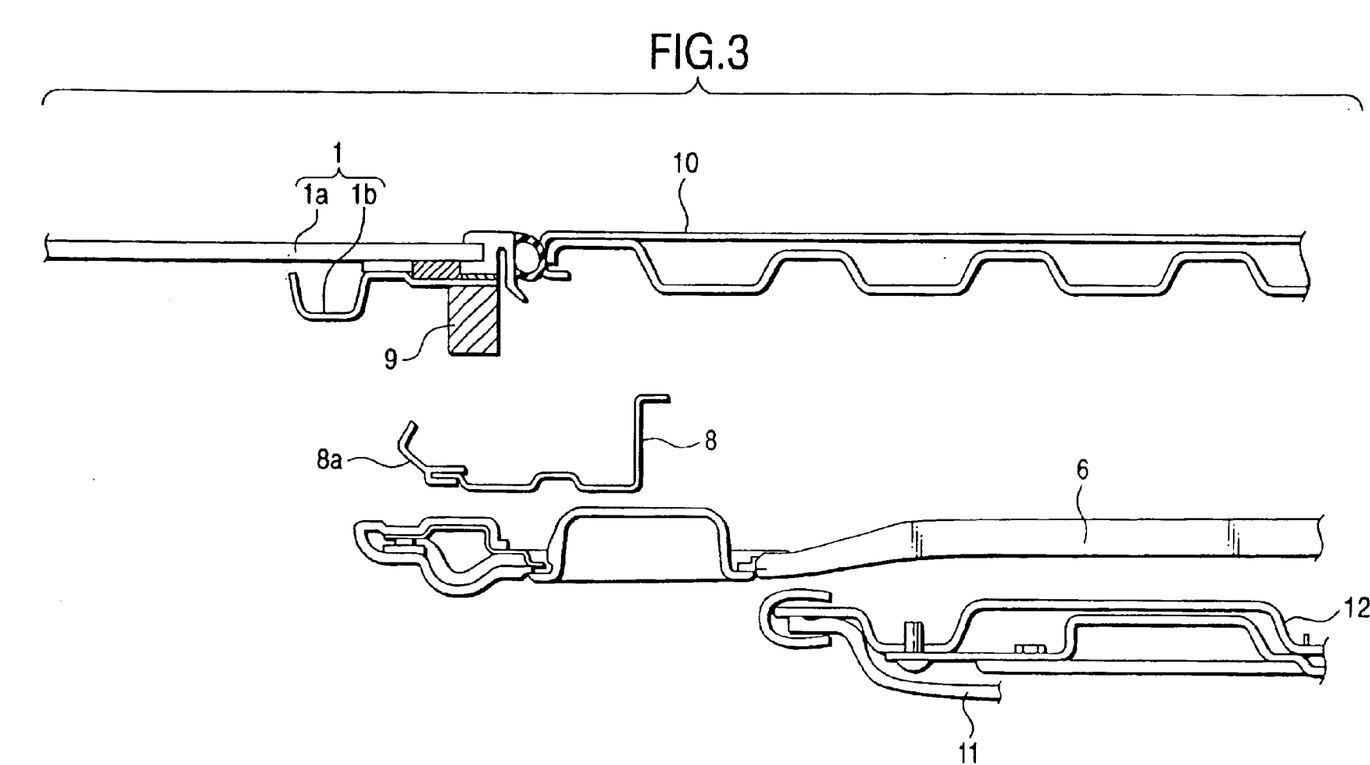
FIG. 3 is an end view (with a sunroof being closed) of a central portion of a vehicle according to the embodiment shown in FIG. 1 where taken along a plane in parallel with a longitudinal direction of the vehicle.
Figure 4:
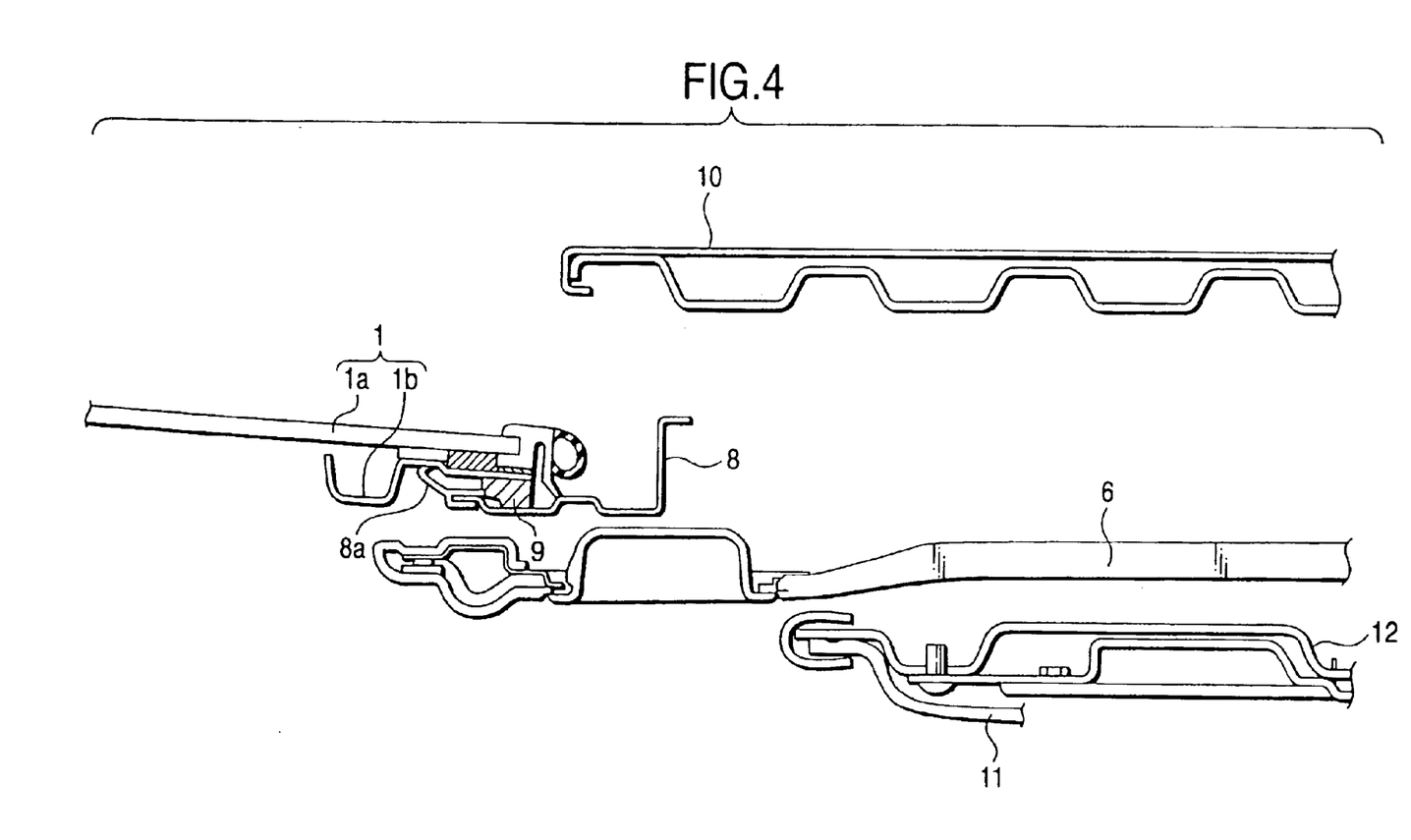
FIG. 4 is an end view showing a state in which the sunroof is opened (with the movable lid being situated at a lowermost position)
Figure 5:
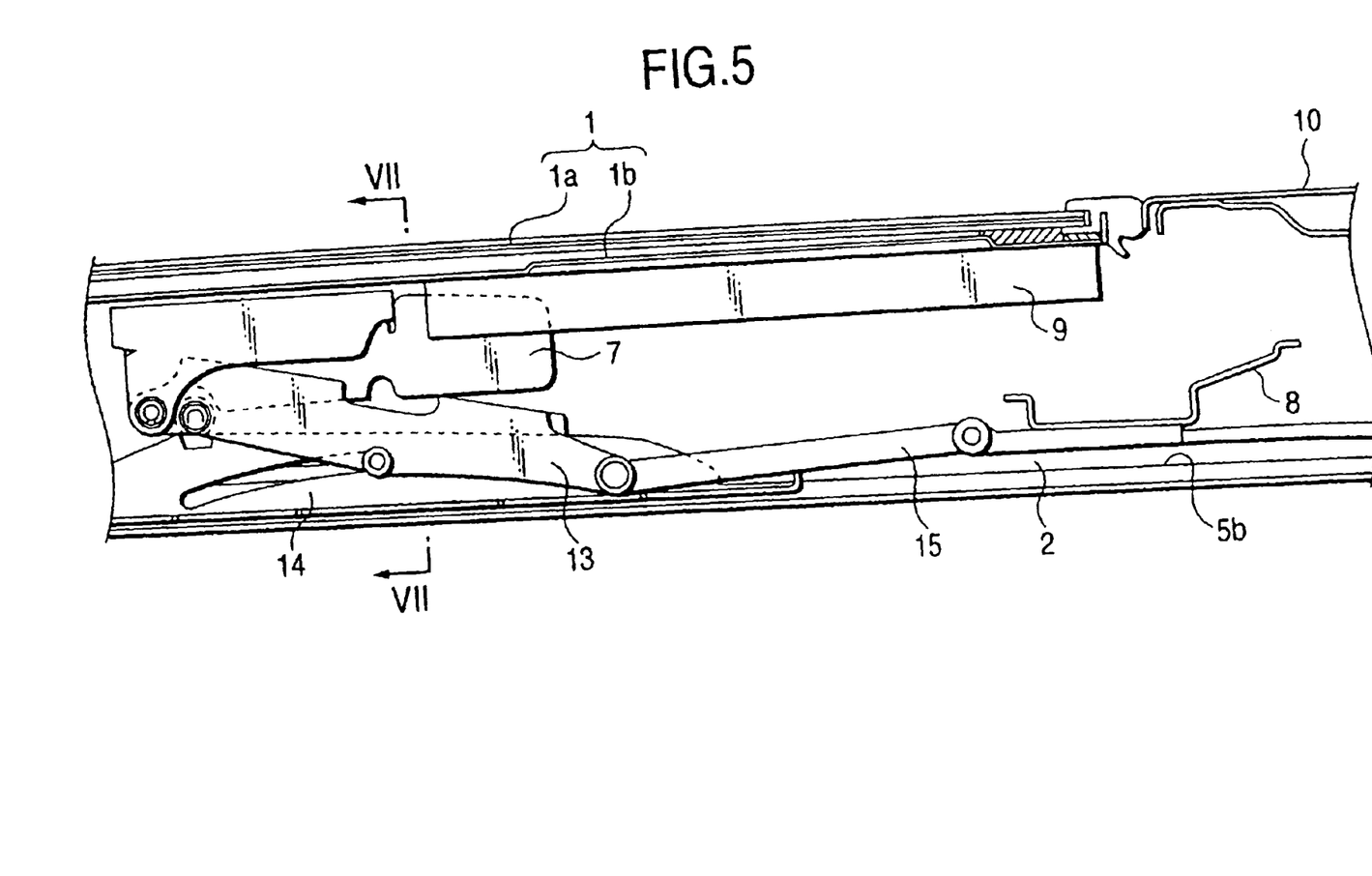
FIG. 5 is a side view showing the vicinity of a side edge of the movable lid according to the embodiment shown in FIG. 1 as viewed from the outside of the vehicle (with the sunroof being closed)
Figure 6:
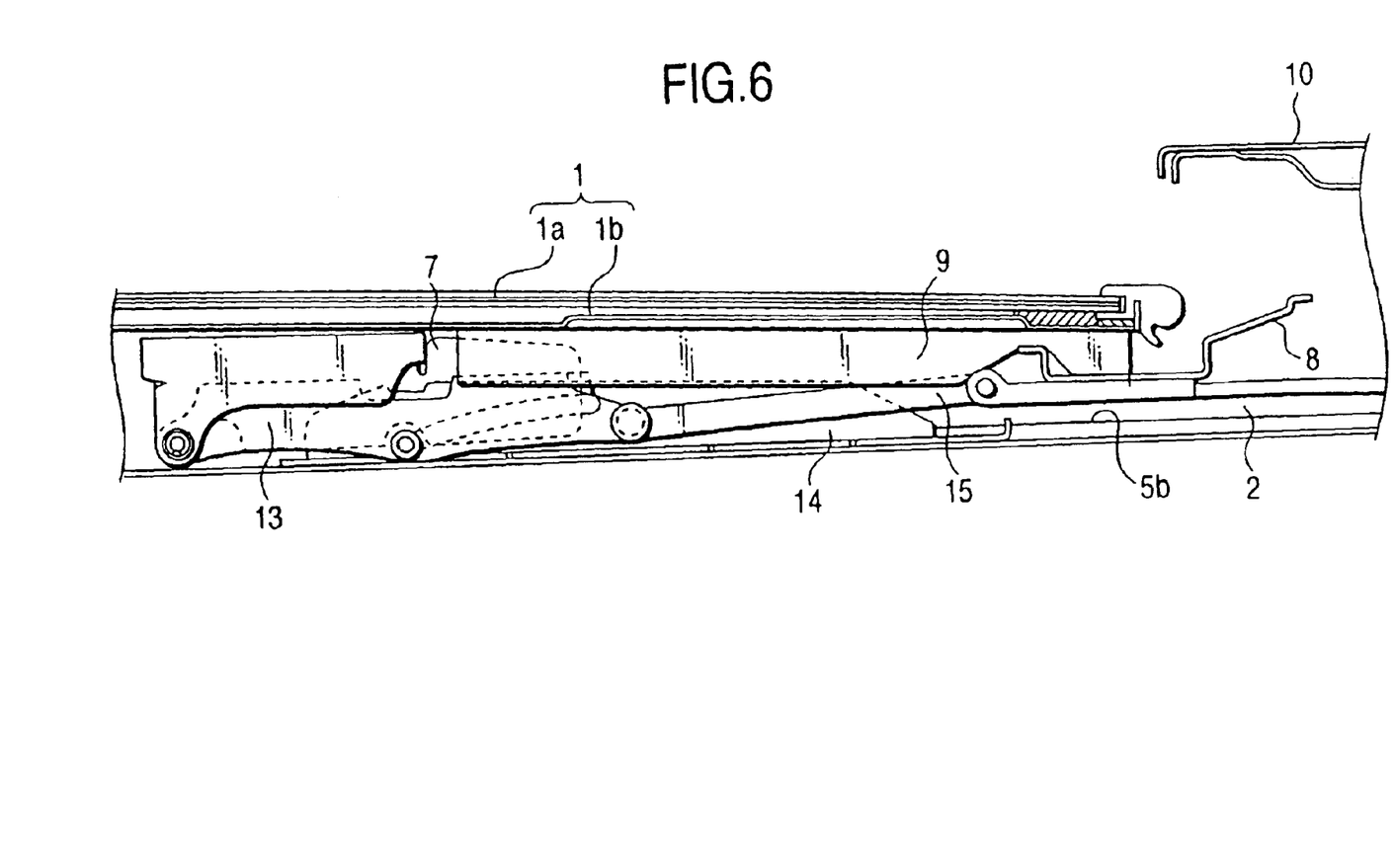
FIG. 6 is a side view showing a state in which the sunroof is opened (with the movable lid being situated at the lowermost position)
Figure 7:
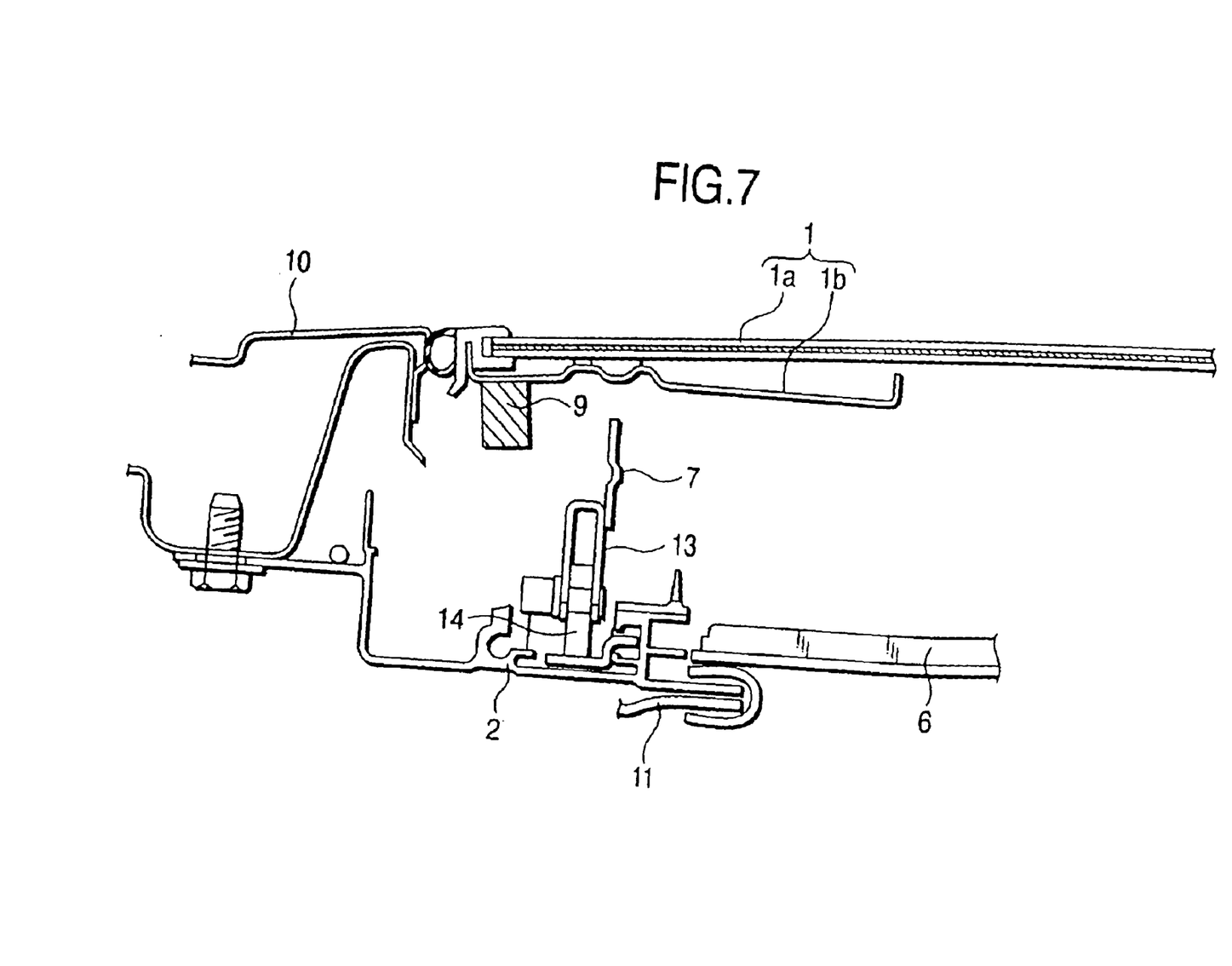
FIG. 7 is an end view taken along the line VII—VII in FIG. 5 (with the sunroof being closed).
Figure 8:
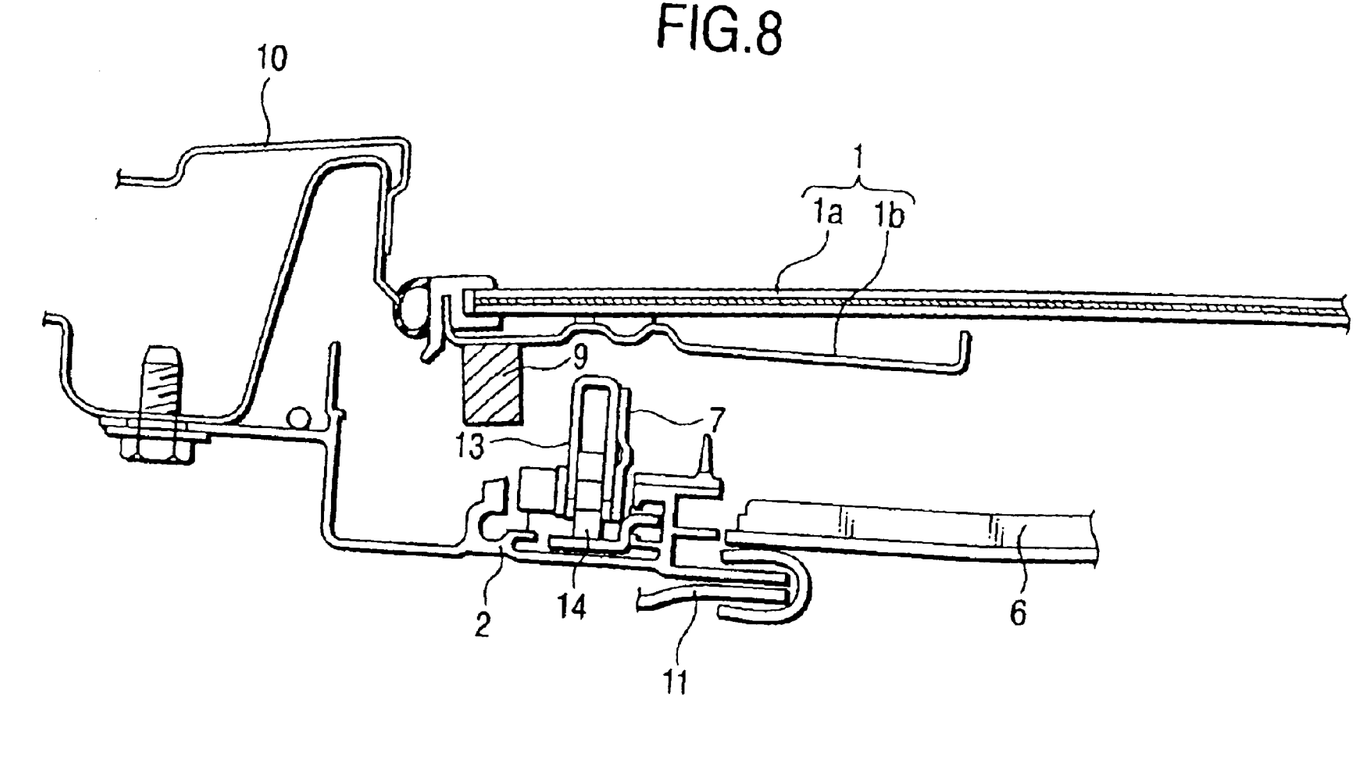
FIG. 8 is an end view showing the state shown in FIG. 7 in which the sunroof is opened (with the movable lid being situated at the lowermost position)

FIGS. 3 and 4 are end views at the center of the vehicle, taken along a plane which is in parallel with the longitudinal direction of the vehicle. FIGS. 3 and 4 are views as seen from the left side of the vehicle, and the right side of each view is the rear of the vehicle. FIGS. 5 and 6 are side views where the bracket 7 on the side of the vehicle is seen from the outside of the vehicle. FIGS. 7 and 8 are end views taken along the line VII—VII in FIG. 5. FIGS. 7 and 8 also depict the bracket portion on the left side of the vehicle, and an opposite side to the viewer of each drawing is the front of the vehicle. FIGS. 3, 5 and 7 illustrate a state in which the sunroof is closed, and FIGS. 4, 6 and 8 illustrate a state in which the movable lid 1 is lowered to a lowest position thereof when the sunroof is opened.

As shown in FIGS. 3 and 4, a rubber strip 8a is mounted on a front edge portion of the drain plate 8 except for portions in the vicinity of ends thereof. The strip 8a prevents droplets of water collected from the interior of the drain plate 8 from dripping and/or scattering further into the passenger compartment. The strip 8a is adapted to be collapsed as shown in FIG. 4 when pressed against from above. Due to this, the dimension of the space formed between the movable lid 1 and the drain plate 8 in the initial state (in the state in which the sunroof is closed) can be set small from the beginning of the design.

In this embodiment, furthermore, the resilient lid 9 is mounted on the lower surface of the movable lid 1. As a result, the line of sight from the passenger compartment is blocked by the resilient member 9, whereby the exposure of the interior of the roof can be prevented. Then, when the movable lid 1 is descended downwardly, as shown in FIG. 4, the resilient member 9 is pressed against the interior of the drain plate 8 and is then deformed to be collapsed. Since the resilient member 9 is deformed, there is no risk that the descending amount of the movable lid 1 is eliminated, and a sufficient descending amount can be secured, whereby the movable lid 1 can be accommodated in the interior of the roof. Note that as this occurs, the strip 8a is also deformed so as to be collapsed, which contributes to securing the sufficient descending amount for the movable lid 1.

The resilient member 9 is set so as to extend around the corners of the movable lid 1 as far as the sides thereof. Due to this, as shown in FIGS. 5 and 6, the resilient member 9 and the front edge of the drain plate 8 interfere with each other at the portions where the resilient member 9 extends around the corners of the movable lid 1 as far as the ends thereof. However, as this occurs, too, the resilient member 9 is easily deformed as shown in FIG. 6, and therefore, there is no risk that the descending amount of the movable lid 1 is reduced. In addition, the rearmost bracket 7 is swingably mounted on a first link member 13, and the first link member 13 is mounted in a slit (cam profile) in a second link member 14 there be low via a camshaft. In addition, a front end of a third link member 15 is mounted to a rear end of the first link member 13, and a rear end of the third link member 15 is coupled to the drain plate 8.

When the sunroof is opened by the motor 5a, the second link member 14 is moved toward the rear of the vehicle on the side rails 2 via the wire 5b. In conjunction with this, the first link member 13 is moved downwardly to follow the slit in the second link member 14, and the bracket 7 is lowered to a state shown in FIG. 6 with a rear end thereof being lowered. In reality, the front pair of brackets 7 (refer to FIG. 1) cooperate with the rear pair to allow the movable lid 1 to descend.

When the second link member 14 is caused to slide rearward further by the wire 5b, the movable lid 1 is accommodated in the interior of the roof. As this occurs, the drain plate 8 which is connected to the movable lid 1 via the first link member 13 and the third link member 15 is also so accommodated together with the movable lid 1. In addition, as shown in FIGS. 7 and 8, the portions of the resilient member 9 which extend as far as the sides of the movable lid 1 are situated above the dripping portions of the side rails 2 which are situated outwardly of the link members, and therefore, there is caused no risk that the resilient member 9 interferes with the link mechanism. The dripping portions are portions which function as water shoots when collecting droplets of water collected by the drain plate 8 to be discharged to the outside of the vehicle. Thus, there is no risk that the provision of the resilient member 9 blocks the descending and sliding operations of the movable lid 1.

The sunroof structure of the invention is not limited to the embodiment described above. For example, in the above embodiment, the resilient member 9 is pressed against the drain plate 8 which slides together with the movable lid 1. However, it is not limited to the drain plate against which the resilient member is pressed. In addition, as to the descending and sliding of the movable lid 1, various forms can be considered. For example, only the rear edge side of the movable lid may be lowered after the sunroof is operated to open and as the movable lid slides, the front edge side may be lowered gradually, or the sliding of the movable lid may be started after the movable lid is lowered completely. Alternatively, the descending and sliding of the movable lid may be started substantially simultaneously, and after the movable lid has been lowered to the lowest position, only the sliding of the movable lid may be implemented. In the above structure, material of the resilient member 9 may compose anyone or more of plastics, rubber, foaming materials.

According to the sunroof structure of the invention, the provision of the resilient member can realize the good quality of internal appearance by blocking the line of sight into the interior of the roof without any damage to the function of the sunroof. As this occurs, it is possible to compatibly realize not only the securing of the sufficient descending amount for the movable lid by using the resilient member that is resiliently deformable to block the line of sight but also the obtaining of the sufficient of the blocking effect sight line by increasing the height of the resilient member.

The disclosure of Japanese Patent Application No. 2001-398891 filed on Dec. 28, 2001 including the specification, drawings and abstract is incorporated herein by reference in its entirety.

While the presently preferred embodiments of the present invention have been shown and described, it is to be understood that these disclosures are for the purpose of illustration and that various changes and modifications may be made without departing from the scope of the present invention as set forth in the appended claims.

What is claimed is:

1. The sunroof structure, for a vehicle, having a movable lid for opening and closing an opening formed in a vehicle roof panel, said movable lid being accommodated in an interior of a roof of said vehicle when said sunroof is opened, and an actuating unit for moving said movable lid in a longitudinal direction of said vehicle, comprising:

a pair of side rails provided beside said movable lid; and, a resilient member provided under said movable lid along at least a rear end edge thereof so as to be suspended downwardly, wherein said resilient member ends at a location along a side edge of said moveable lid, wherein said moving unit has at least a pair of brackets for moving said movable lid along said side rails while supporting said movable lid from below, wherein said resilient member ends at location along said side edge where said resilient member and rearmost brackets of said pair of brackets are aligned.

2. The sunroof structure as set forth in claim 1, further comprising:

a drain plate provided under said rear end edge of said movable lid for moving longitudinally and rearwardly together with said movable lid; and wherein said actuating unit moves said movable lid downwardly and rearwardly when said sunroof is operated, and wherein said resilient member is pressed against an upper surface of said drain plate to be deformed when said sunroof is operated.

3. The sunroof structure as set forth in claim 1, wherein:

said resilient member is provided to extend around corners of said movable lid.

4. The sunroof structure as set forth in claim 2, wherein:

said resilient member is provided to extend around said corners of said movable lid.

5. The sunroof of structure as set forth in claim 3, wherein:

said actuating unit has at least a pair of said rearmost brackets for moving said movable lid along said side rails while supporting said movable lid from below, and wherein an end portion of said resilient member is situated on a back side of said rearmost brackets.

6. The sunroof structure as set forth in claim 4, wherein:

said actuating unit has at least a pair of said rearmost brackets for moving said movable lid along said side rails while supporting said movable lid from below, and wherein end portions of said resilient member are situated on a back side of said rearmost brackets.

7. The sunroof structure as set forth in claim 1, wherein:

said movable lid is made from a sheet of glass.

8. The sunroof structure as set forth in claim 1, wherein said resilient member is mounted on a lower side of said moveable lid in a U-shaped fashion in accordance with a top planar view of said sunroof structure.

9. The sunroof structure as set forth in claim 2, wherein a collapsible strip is mounted on a front edge portion of said drain plate.

10. The sunroof structure as set forth in claim 9, wherein said collapsible strip is collapsed downward when said resilient member is pressed against said upper surface of said drain plate.

\* \* \* \* \*